(12) United States Patent
Glynn et al.

(10) Patent No.: US 7,412,795 B2
(45) Date of Patent: Aug. 19, 2008

(54) COLLAPSIBLE DREDGE AND METHODS OF USE THEREFOR

(75) Inventors: Kevin B. Glynn, East Falmouth, MA (US); Christopher Godino, Waban, MA (US)

(73) Assignee: Offshore Innovations, Inc., Falmouth, MA (US)

( * ) Notice: Subject to any disclaimer, the term of this patent is extended or adjusted under 35 U.S.C. 154(b) by 190 days.

(21) Appl. No.: 11/443,462

(22) Filed: May 30, 2006

(65) Prior Publication Data

US 2007/0094914 A1    May 3, 2007

Related U.S. Application Data

(60) Provisional application No. 60/732,881, filed on Nov. 2, 2005.

(51) Int. Cl.
*A01K 91/053*    (2006.01)
(52) U.S. Cl. ..................................... 43/42.74
(58) Field of Classification Search ............... 43/42.74, 43/27.4, 10, 105
See application file for complete search history.

(56) References Cited

U.S. PATENT DOCUMENTS

| | | | | |
|---|---|---|---|---|
| 132,476 A * | 10/1872 | Livaudais | ............ | 43/105 |
| 458,456 A * | 8/1891 | Hefftner | ............ | 43/105 |
| 1,036,574 A * | 8/1912 | Crane | ............ | 43/105 |
| 1,463,062 A * | 7/1923 | Effie | ............ | 43/105 |
| 1,958,724 A * | 5/1934 | Stanislaw | ............ | 43/100 |
| 2,165,516 A * | 7/1939 | Stein et al. | ............ | 43/105 |
| 2,196,472 A * | 4/1940 | Moriarty | ............ | 43/21.2 |
| 2,652,656 A * | 9/1953 | Glasser | ............ | 43/105 |
| 2,728,164 A * | 12/1955 | Mears | ............ | 43/105 |
| 4,561,206 A * | 12/1985 | Lowrance et al. | ............ | 43/43.11 |
| 4,893,432 A * | 1/1990 | Rosengrant | ............ | 43/42.74 |
| 4,956,935 A * | 9/1990 | Riddell | ............ | 43/105 |
| 5,737,869 A * | 4/1998 | Murguido | ............ | 43/100 |
| 6,000,166 A | 12/1999 | Kirkpatrick | | |
| 6,493,985 B2 * | 12/2002 | Matches et al. | ............ | 43/105 |
| 7,032,344 B2 | 4/2006 | Gearhart | | |

OTHER PUBLICATIONS

3 Photographs of a prior art dredge known in the industry as the Stripteaser dredge. Photograph 1 depicts the dredge in the closed position with radial arms extending from center. Photograph 2 is a close-up of the central pressure mechanism and a view of the loop attachment of the dredge arms to the center. Photograph 3 is a close-up of the center and a view of attachment of loop ends of the dredge arms curling around the center.

Drawings and photographs of a prior art dredge known in the industry as the Magic Wand dredge, as shown in an online catalog from InTheBite.com. Link to webpage: http://www.inthebite.com/tackle_tips/majicdredge0202/index.shtml.

* cited by examiner

*Primary Examiner*—Kurt Rowan
(74) *Attorney, Agent, or Firm*—Sonia K. Guterman; Lawson & Weitzen, LLP

(57) ABSTRACT

A unitary, rotational, and collapsible luring dredge capable is rapid and convenient assembly for use and collapse for storage is provided, as are methods and kits for use.

19 Claims, 5 Drawing Sheets

COLLAPSIBLE DREDGE AND METHODS OF USE THEREFOR

RELATED APPLICATION

The present application claims the benefit of U.S. provisional application entitled, "Collapsible Dredge and Methods of Use Therefor", having Ser. No. 60/732,881, filed Nov. 2, 2005, and which is hereby incorporated by reference herein in its entirety.

TECHNICAL FIELD

This invention relates to a luring dredge for attracting aquatic animals, and methods and kits for use.

BACKGROUND OF THE INVENTION

For centuries, fishermen have sought to attract and lure large marine animals to aquatic vessels so that the animals could be more easily caught from the vessel. Carnivorous aquatic animals eat smaller animals, and are therefore attracted to blood or artificial lures simulating live bait. Methods to attract such large fish include large fishing rods attached to lures and bait, and placing "chum", i.e. blood and animal pieces, into the water near the vessel.

Luring dredges are devices with multiple bait or lures that are dragged through the water by the moving vessels, simulating a school of fish, and thereby attracting the larger animals. Presently available luring dredges present a number of difficulties both in storage and in use. Many are difficult to store because they often are necessarily bulky, with thin, metallic arms extending out in many directions from a centralized hub, in order to avoid entanglements among the lures and bait on the arms. A luring dredge designed so that the arms cannot collapse takes up a great deal of space and remains vulnerable to breaking. Alternatively, the arms of some luring dredges collapse by folding together like an umbrella, or the arms are reversibly screwed to the centrally located hub. A drawback of these luring dredges is insufficient strength in the arms, since the arms of one current model are not permanently attached to the hub, and the arms of another current model are collapsible and have reduced strength at the joints.

During use, the arms of a luring dredge are subject to great and often varied forces of the vessel dragging the lure, and the water's natural current. As a result of these forces, the arms of current collapsible luring designs often break free from the hub, or they break internally. Further, as many current luring dredges require assembly from multiple components, use in an open vessel at sea is not convenient, and component parts are easily lost, such as the rivets used for assembly, wasting valuable resources. Assembling the various components of the dredges can take 15 to 20 minutes or more, wasting the time of the commercial or sports personnel.

Improved designs for luring dredges and methods of use are desirable.

SUMMARY

An embodiment of the invention provided herein is a device for catching animals, and for attracting aquatic animals to a moving vessel. The device has an open position for use and a closed position for collapsing for storage. The device includes a hub and a plurality of arms, the hub being centrally located with respect to the arms, the arms are radially distributed around the hub and along the length of the hub, so that when the device is collapsed into the closed position for storage the arms lie in a plane of the length of the hub and extending through the radial center of the hub, and when the device is in the open position, each pair of arms lies in a plane offset by an angle from respective planes of the at least one further pair of other arms, the angle being determined by the number of the plurality of arms. Each of the arms further comprises a plurality of swivel sleeves for attachment for lures, bait, and baited hooks.

Also provided herein is a device for catching and attracting aquatic animals to a moving vessel, the device having an open position for use and a closed position for collapsing for storage, the device comprising a hub having a length and a width and a plurality of arms wherein the hub is centrally located with respect to the arms and the arms are radially distributed around the hub and along the length of the hub. The hub has a housing, and a spindle is situated within the housing, the housing and the spindle being hollow. The housing is made from two or more, i.e., a plurality of segments distributed along the length of the hub. Each of the housing and spindle has a plurality of pairs of lateral apertures, with each member of the pair of apertures being diametrically arrayed 180° around the respective spindle and segments of the housing. The device further has a plurality of rods, each rod extending through a pair of lateral apertures in the segment housing, the rod forming a pair of arms each of which generally is about of equal length so that the hub bisects the rod into two arms. When the device is collapsed into the closed position for storage, the segments and rods lie in a plane that extends through the center of the hub and parallel to the axis of the length of the hub. When the device is in the open position, each pair of arms lies in a plane offset by an angle from the plane of a further pair of arms, and the angle is determined by the number of arms. The arms and segments are rotated to change the device from the closed to the open position and back into the closed position. Each of the arms has a plurality of swivel sleeves for attachment for lures, bait, or baited hooks.

In a related embodiment, the housing segments comprise a top cap, a bottom cap, and a plurality of mid segments situated between the top cap and bottom cap, and the spindle is enclosed in the housing. The spindle further has an upper end and a lower end, and the upper end of the spindle has threads on an outer surface, and the top cap has threads on an inner surface for screwing to the top of the spindle. Reversible rotation of the top cap along the threads in contact with the spindle upper end, with respect to the mid-segments and bottom cap, is means for alternately locking and releasing the spindle and rods within the housing in the open or closed position. Thus, the top cap has the means for loosening the position of the device into a position for rotational movement of the spindle and rods. At least one pair of spindle lateral apertures is U-shaped, and the rod penetrating the housing segment and spindle through a U-shaped aperture portion is alternately and rotationally displaced from one to another of U termini as the device is opened or closed, respectively. Rotationally screwing the top cap and the rods with respect to the spindle locks the rods into the open or closed position. The spindle is made out of at least one material from the group of: nickel, brass, bronze, aluminum, acrylic, stainless steel, a composite, and a nickel-plated material selected from this group.

Generally, both the top cap and the bottom cap further have a swivel, and the swivel has an inner loop and an outer loop, each loop of the swivel capable of moving rotationally with respect to the other loop. Each of these swivels is located in the top cap and the bottom cap, inserted so that the inner loop of the swivel is within the spindle, and a rod that extends through the housing and spindle further extends through a series of apertures, starting with the inner loop of the swivel. The rod through the bottom cap extends through the hub, penetrating components as follows: the rod extends through the first circular lateral aperture of the housing, the first U-shaped aperture of the spindle, the swivel loop, the second U-shaped aperture diametrically arrayed on the spindle, and the second lateral aperture diametrically arrayed on the bottom cap. With respect to the spindle apertures, at least one pair of lateral spindle apertures is oval, such that the long axis of the oval is parallel to the length of the spindle, and at least one pair of apertures on the spindle is U-shaped.

In an embodiment of the device in which the plurality of rods is three, the angle of offset of the plane of one of the arms in the open position with respect to another arm is about 60° around the length of the hub. Alternatively, in an embodiment of the device in which the plurality of rods is four rods, and the angle of offset of the plane of one of arm in the open position with respect to another arm is about 45° around the length of the hub. The device can be used to catch small animals, generally fish, or very large pelagic animals, such as fish or sharks. Thus, in one embodiment, the rod is at least about 10 inches in length. Alternatively, the rod is at least about 50 inches in length. In a particular embodiment, the rod is about 36 inches in length. The cross-sectional diameter of the rod is, in various embodiments, about one-eighth of an inch, 3/16 of an inch, or about one-quarter inch. The rod is made from a material selected from the group of: titanium, aluminum, acrylic, stainless steel, and a composite.

An embodiment of the device further includes a spring located between the lower end of the spindle in the housing and bottom cap. Another embodiment of the device further includes a snap ring in the top cap. Another embodiment of the device further includes a friction washer between the top cap and an adjacent mid-section.

Also provided herein is a method for catching an aquatic animal, or example, a pelagic animal, or attracting an animal to a vessel, using any of the above devices, the method comprising:

opening the device for use by screwing the top end cap rotationally with respect to at least one of the mid segment and bottom cap to release the rods in the closed postion, pushing the top cap toward the bottom cap and rotating the rods within the U-shaped apertures from one to the other U-terminus, wherein the rods are moved into the open position;

screwing the top end cap rotationally and oppositely to lock the arms into the open position; and attaching lures, bait or hooks to the arms, wherein the device is used for catching or attracting the animal to the vessel.

In a related embodiment, the method further involves:

attaching a first tether by first end to the swivel on the top cap, whereby the device is attached by a second end of the first tether to the vessel.

In a related embodiment, the method further involves:

attaching a first end of a second tether to the swivel at the bottom cap, and attaching a second end of the second tether to at least one additional device above, wherein an array of devices is provided.

Also provided herein is a kit for a unitary collapsible device for catching or attracting an aquatic animal comprising at least one device as described above, and a carrying bag. The kit can further include at least one hook, lure or artificial bait.

The kit can further include two or more devices, and in a related embodiment, at least one of the devices comprises rods of length different than rods of another device.

BRIEF DESCRIPTION OF THE DRAWINGS

In the accompanying drawings:

FIG. 2 is a set of drawings of various perspectives of a top cap of the hub of the luring dredge.

FIG. 3 is a set of drawings of various perspectives of a mid segment of the housing.

FIG. 4 is a set of drawings of various perspectives of a housing bottom cap of the center hub of the luring dredge.

FIG. 5 is a set of drawings of various perspectives of a spindle.

DETAILED DESCRIPTION

An object of this invention is to provide luring dredges that are strong, easy and fast to assemble, and convenient to store, without sacrificing strength or durability, and having minimal detachable parts. The dredges herein are devices that are unitary, i.e., are changed from an open position for use to a closed position for storage in a small and/or flat location such as a low shelf, without removal of parts. The means for alternating between open and closed positions relate to the rotational feature of various components with respect to other components, i.e., a number of arms rotate about a hub so that in the closed position, all arms lie flat in a single plane, i.e., the arms of the device lie in a two-dimensional configuration. After rotation of the arms into the open position, the arms are offset from each other and are distributed around the hub by roughly equal angles, forming a three-dimensional device to which lures and/or live bait can be attached. In an alternative embodiment, hooks or baited hooks are attached, for catching fish, particularly smaller fish. Thus, the arms do not bend like the spokes of a collapsible umbrella, nor are the arms detached and re-attached by rivets or some other mechanism, rather the arms rotate so that the device is collapsible into the closed position, and the device retains the strength conferred by the unitary nature.

Figure 1:
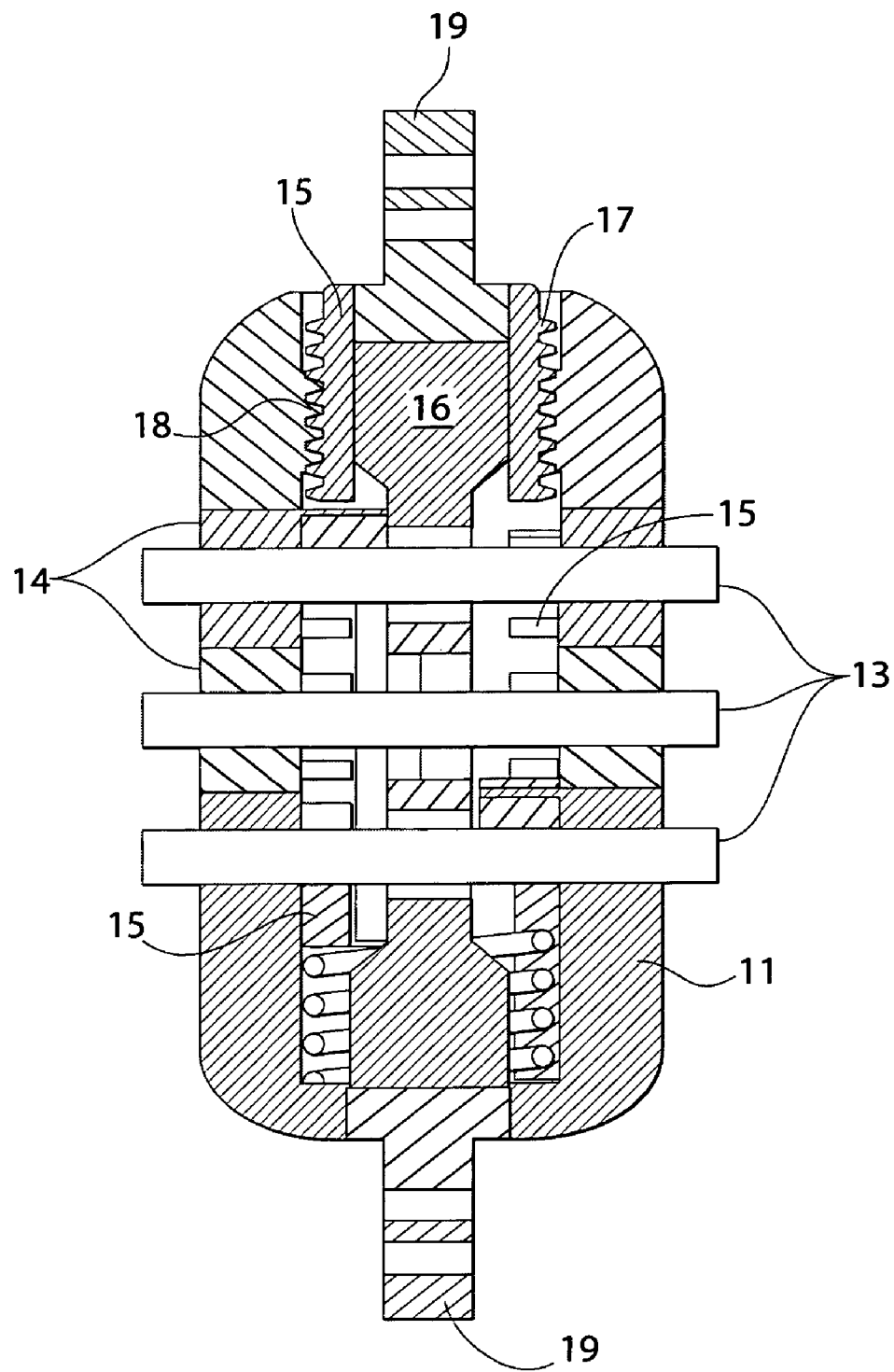
FIG. 1 is a drawing of a longitudinal cross section of a luring dredge device with the central hub and rods.

With reference to the drawings, FIG. 1 is a drawing that shows a longitudinal section of the dredge, i.e., parallel to the length of the hub and passing through its rotational axis of symmetry. As shown in FIG. 1, the hub is penetrated by three rods, 13, although additional rods are within the scope of the conception of the device. The hub includes a housing which is segmented, having a top cap, 18, with a top aperture and a threaded inner surface; a bottom cap, 11, which has respective upper and lower apertures; and mid-segments, 14. The hub shown in FIG. 1 shows that the three rods, i.e., six arms, lie parallel to each other, i.e., the device is in the closed position.

The top cap and bottom cap are circular in cross section, i.e., a plane perpendicular to the length of the hub, and are hollow, i.e., each cap has a central cavity into which during manufacture is inserted a spindle, 15, having a length and width and also being circular in cross section and hollow. The functional relationship of the spindle to the housing may be compared to that of a lock mechanism within a door. To fit within the housing, the diameter of the outer surface of the spindle is smaller than the diameter of the inner surface of the housing. Further, the upper outer surface of the spindle has threads that can be used to suspend the spindle within the housing and in contact at the upper portion of the length of each of the housing and spindle. The length of the spindle is less than that of the housing, forming a space beneath the spindle within the housing.

A portion of a set of rods, 13, is shown in FIG. 1 as extending through the hub, penetrating pairs of lateral apertures located in each of the housing and the spindle. Each rod is approximately bisected in overall length by the hub, i.e., each rod comprises two arms that extend at approximately equal lengths from the hub outwardly, and 180° away from each other with respect to the circular cross-section of the hub. The rods in general are manufactured from a strong and somewhat rigid material, i.e., the rods (13) are envisioned as long metallic sticks having a circular cross-section, and that penetrate the layers of the hub and spindle within the hub. As the device is unitary, the rods are not removed from the hub by the user for storage, thus minimizing loss of essential components of the dredge and facilitating assembly of the dredge for use in fishing.

The lowest, with respect to the length of the hub, of the plurality of rods extends through the hub at the bottom cap, 11, and each of the other two rods are located at a position higher on the device, extending through lateral apertures in mid segments, 14. Two mid segments of the hub, each having a pair of apertures through which the rod extends, are illustrated, however additional mid-segments are within the scope of various embodiments of the devices herein. Each of the hub mid-segments has the same outer and inner diameters as the lateral portions of the top cap and bottom cap, and are held in place by the spindle that extends into the hollow center of each, and each mid-segment can rotate independently with respect to each other and the top and bottom caps.

Also present within the housing, below the length of the spindle shown in FIG. 1, and fitted into the space beneath the spindle in the housing, is a spring, 12. The spring is compressed by the screwing action of the spindle within the housing, as the top cap is rotated with respect to other segments of the housing to place the device in the open and closed positions, however is not essential to the mechanism of opening and closing. Rather, the presence of the spring provides the mechanism with a firm response and greater assurance of the change in the position of the components.

FIG. 1 further shows swivels, 19, that extend from the top and bottom of the top cap and bottom cap, respectively, in a manner that allows a loop on an external portion of the swivel outside the hub to rotate freely, while an internal portion remains in the hollow spaces beneath the top opening of the top cap and above the bottom opening of the bottom cap. Swivels for fishing apparatus are well known and are commercially available. The external loops of the swivels are used for attaching lines, from the top swivel to the boat, and from the bottom swivel to another dredge to form an array of dredges. Swivels are commercially available, for example, from Rite Angler, Fort Lauderdale, Fla.

FIG. 1 thus illustrates that the luring dredge is unitary, as it when used it has only a single piece of equipment that does not come apart; rotational, because it can be configured into two positions: a locked, open position for use, and a closed position for storage, as demonstrated in FIG. 1, illustrating a cross section of the spindle as viewed from its lateral end when in the closed position; and collapsible, because when in a closed position, as demonstrated in FIG. 1, the plurality of rods and the spindle's lateral end lie along a single plane.

The device is shifted from the closed position to the open position in a few seconds, or less than a minute, requiring only pressure and rotation to release the device from one position into the alternative position. The only further assembly prior to use is attachment of lures, hooks, or live bait, or a combination of these, to swivel sleeves, the swivel sleeves being present at several intervals along the length of each arm. As lures and bait are standard operating equipment in the art, and as one of ordinary skill in the art desires to use different lures, bait, and baited hooks that depend on the geographical location and nature of the animal being sought, assembly in the form of adding at least one of lures, bait, and baited hooks does not detract from the unitary nature of the dredge devices herein. Further, both the nature of the lure or bait, and the amount, i.e., the number of swivel sleeves to which bait or a lure is attached, and chosen by the user.

These and other features, advantages and objects of the present invention will be further understood and appreciated by those skilled in the art by reference to the following specification, claims and drawings.

In accordance with embodiments of the invention, the hub is centrally located in the device, and has two parts, the housing, and the spindle which is located within the housing. In accordance with an embodiment of the invention, the housing is segmented into at least four segments which are manufactured as separate parts: two end caps, which are a top cap and a bottom cap, and mid-segments each of which topologically has a tubular or ring shape.

In accordance with the invention, the housing may be segmented with as many mid-segments as desired or as practicable. In accordance to the invention, when the segments of the housing are connected to form a completed hub, most of the length of the housing is shaped approximately like a cylinder, or any variety of geometric shapes that can encapsulate the spindle. However it is only necessary that the inner aperture of the housing be circular, so that the spindle can rotate within, and that the housing outer surface can easily be manufactured in other geometric shapes, such as squares, for ease of manipulation.

In accordance with an embodiment of the invention, each segment of the housing, including both end caps and all mid-segment pieces, are manufactured from aluminum that is electroplated to prevent corrosion by salt water, and to prevent generating electric charges as a result of contact with the other metallic materials. A thin coating of aluminum oxide is anodized on the surface of the housing segments. Hard anodizing requires an electrolysis process that produces a dense layer of aluminum oxide both on and in the aluminum surface. The thickness of this hard-anodized coating ranges from 1-3 mil or more. The coating thickness is a function of current density, time in solution, temperature, the composition of the alloy and the solution itself, which can be supplied by, and applied with, kits by people with ordinary skill in the industry. In accordance to the invention, the housing segments may also be made from materials such as aluminum, acrylic, stainless steel, a composite, and essentially any strong, durable material that does not rust. Anodizing and electroplating are well known in the art of aluminum components, and kits and reagents are commercially available, for example from R. Newman, Danville, Pa. Stainless steel can be of type 316L, which is a low carbon grade that is particularly corrosion resistant, and is commercially available. The chemical characterization of 316L steel, in addition to iron, are <0.03% C, 16-18.5% Cr, 10-14% Ni, 2-3% Mo, <2% Mn, <1% Si, <0.045% P, <0.03% S, however any corrosion resistant steel is suitable for the housing components.

Figure 2A:
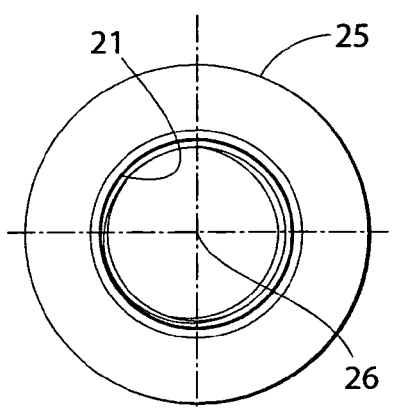
FIG. 2A is a drawing of a transverse cross section of the top cap viewed from the bottom.
Figure 2B:
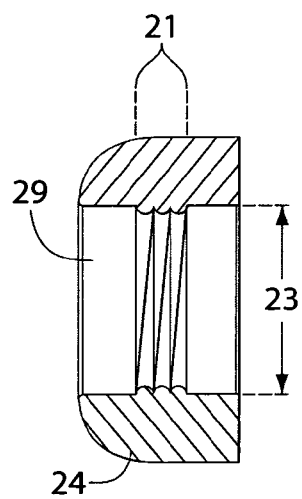
FIG. 2B is a drawing of a side view of the top cap showing the upper end of the spindle attached to the top cap by a screw mechanism.
Figure 2C:
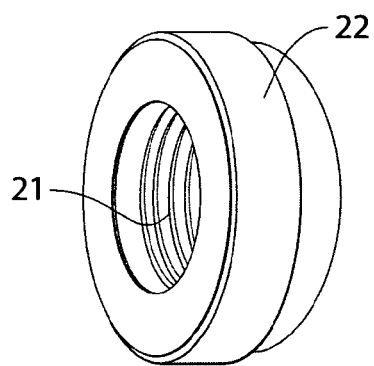
FIG. 2C is a drawing of a perspective view of the top cap viewed from below.

With reference to FIG. 2 three views of the top cap are shown in accordance with an embodiment of the invention. The top cap can be alternatively referred to as a nose cap, a nose section, an upper housing cap, or an upper end. As illustrated by FIGS. 2A and 2C, the top cap is cylindrical in cross section, hollow on the inside, having a circular outer surface 25 when viewed from the top or the bottom.

As illustrated, threads, 21, are present on the inner surface of the hollow portion of the top cap that enable the top cap 24 to screw onto the top of the spindle, 23, the spindle in relationship to the top cap illustrated in FIG. 2B. As illustrated by FIG. 2C, and in accordance with an embodiment of the invention, a portion of the outer surface of the top cap is knurled 22, or made of a uniformly rougher texture to allow a better grip, making tightening and loosening the top cap with respect to the other components of the housing more convenient. In addition or alternatively to the knurled surface, another surface such as the top surface of the cap can be marked with machined wrench flats, for ease of removal or tightening, in the event that a user were to fail to rinse the device following use, and the threads were to become immobilized by salt or corrosion.

In accordance with an embodiments of the invention, when viewed from the bottom, the central interior of the top cap has an aperture, 26, that extends through the top surface of the top cap. A two-loop swivel is placed in this aperture during manufacture by standard techniques so that external portion of the swivel, one of the loops, is external to the top cap, and as the swivel extends through the hole, the other loop of the swivel remains inside the housing, extending through the spindle. A standard two-loop swivel is shaped, for example, like a figure eight, having an inner loop and an outer loop, each loop capable of moving rotationally with respect to the other loop. One of the two loops of a swivel loop lies external to the housing for attachment to a tether, the swivel extending through the top aperture, and the other loop of the swivel remains inside the housing, the swivel extending through the spindle. Swivels are commercially available, for example, from Rosco (Rome Specialty Co., Inc., Rome, N.Y.). The top most of the rods extends through a first lateral (on the side) aperture of the housing, the lateral apertures of the housing being circular, and then the rod extends through a first U-shaped aperture of the spindle, then through the internal loop of the swivel, continuing through the diametrically opposite second U-shaped aperture of the spindle and out of the hub through the diametrically opposite second circular aperture of the housing.

The "U-shaped" apertures of the spindles are elongated holes in which the longer length of the hole extends around the outer circumference of the spindle, and has notches at either end of the hole, conferring what is referred to herein as a U-shape, however the U-shape need not be rounded or precisely in that form. The term "U-shaped" distinguishes certain pairs of the first and second lateral spindle apertures from another pair of spindle apertures which are oval, and from the first and second lateral apertures of the housing which are circular.

In accordance with an embodiment of the invention, the top of the spindle is further grooved within the top aperture. Following assembly of the device from components, a snap ring, 29, is placed within the top aperture of the spindle to prevent the top cap from detaching from the housing. The snap ring is shaped like a washer and functions similarly. The snap ring is placed around the center of the swivel, a portion of which lies inside the top portion of the spindle and extends through the apical aperture of top cap so that another portion of the swivel extends outside of and on top of the device. The snap ring prevents the spindle, swivel, and upper end-cap from detaching from the housing. The ring is constructed of overlapping coils of circular wire that lie in a plane, like a key ring, having the means to slightly expand and contract. Snap rings are commercially available from Hayward Industrial Supplies, Elizabeth, N.J.

As illustrated in FIG. 1 and in accordance with an embodiment of the invention, a plurality of mid-segments, 14, are situated between the two capping heads. The mid-segments are not attached to the top end and bottom end, i.e., they are not physically connected such that they are immobilized, and the mid-segments can rotate clockwise or counter-clockwise about the spindle, like tubular beads rotating on a string. During manufacture of the device, the plurality of mid-segments are placed on top of the bottom cap, one on top of the other, and the top cap with attached spindle is placed upon the top-most mid-segment to create the complete hub.

Figure 3A:
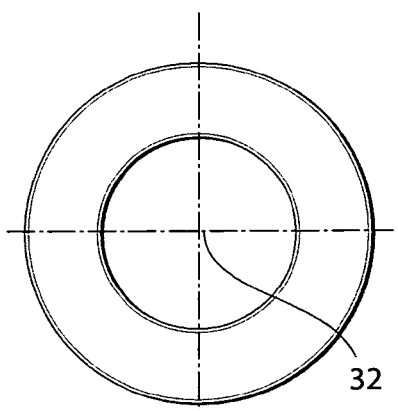
FIG. 3A is a drawing of the mid segment in cross section showing the hollow interior and the inner and outer surfaces.
Figure 3B:
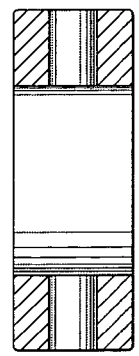
FIG. 3B is a drawing of a side view of the mid segment showing the spindle in the interior.
Figure 3C:
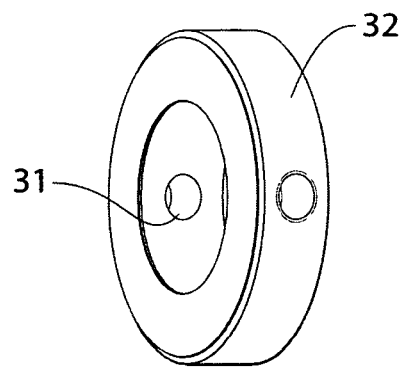
FIG. 3C is a perspective drawing of the mid segment with circular lateral apertures.

With reference to the accompanying drawings FIG. 3A and FIG. 3C, the mid-segments are shaped like rings, i.e., having the same circular inner and outer diameters as the bottom of the top cap, and each mid-segment having a pair of lateral apertures, 31 which are circular in shape, the pair of lateral apertures being 180° around the circular cross-sectional shape, and having a central aperture or hole, 32 in the middle like a doughnut hole. The components of the housing, end caps and mid-segments, are made of stainless steel or anodized aluminum, i.e., aluminum that is electroplated. Stainless steel is particularly resistant to corrosion.

In accordance with use of the housing to facilitate rotation of the rods and to hold the rods in place, a pair of lateral apertures, 31, on opposite sides of each of the mid-segments are formed during manufacture of the housing. With reference to FIG. 3C, the pair of first and second lateral apertures are diametrically arrayed, i.e., are about 180° apart from one another on the circumference of the mid-segment. The diameter of the housing is proportional to the diameter of the device as a whole, i.e., in an embodiment of the device, the rods are 36 inches in length, and the outer diameter of the hub is one inch or ¾ inch or equivalent, for use in attracting or catching pelagic fish found in the open ocean, such as tuna, shark, or bill fish, e.g., marlin, sailfish and swordfish. Alternatively the rods are 12 to 18 inches in length, for use for catching smaller fish closer to shore such as bluefish, striped bass and fluke, and the hub is proportionately smaller, having an outer diameter such as ½ inch or ¼ inch or ⅜ inch. Larger, scaled up versions of the device are also within the embodiments of the invention herein.

In manufacture of the device, the various components with precise placement of apertures are made with any of a cam screw machine, a computerized numerically controlled (CNC) machine, or a multi-spindle lathe, all of which are well known to one of ordinary skill in machining of metal parts. The CNC machine is used to make tools during repeated manufacturing of complex parts from a metal as well as other materials, using a program written in specific notations. However, in accordance with the invention, a person skilled in the arts can make the components utilizing any method that accurately and smoothly drills a hole through metal.

Figure 4A:
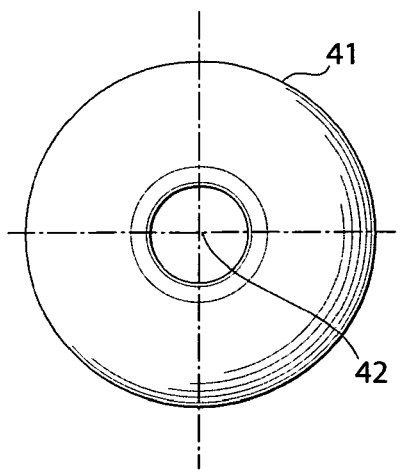
FIG. 4A is a drawing of a top view of the bottom cap.
Figure 4B:
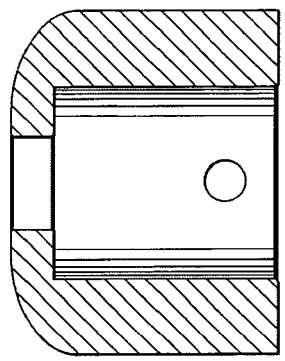
FIG. 4B is a drawing of a cross-section of the bottom cap showing the lower end of the spindle as inserted into the hollow interior.
Figure 4C:
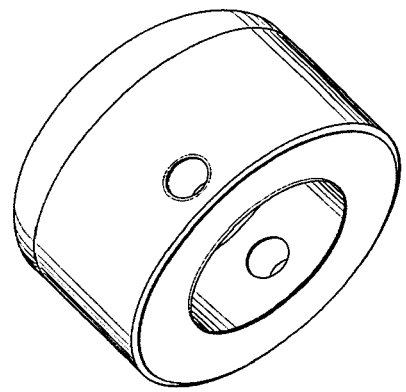
FIG. 4C is a perspective drawing of the bottom cap with circular lateral apertures.

With reference to the drawings, FIG. 4 illustrates three views of the bottom cap in accordance with an embodiment of the invention. Other descriptive names for the bottom cap include tail cap, tail section, and lower end cap. As illustrated by FIG. 4C, the top cap 41 is cylindrical, hollow on the inside and circular in cross section, i.e., when viewed from either the top or the bottom. In various optional embodiments, the top cap and uppermost mid-segment are separated by a friction washer, for example, made of Debrin or nylon, and provides a cushion during tightening of the rods into the open or closed positions.

In accordance with an embodiment of the invention, when viewed from the top, the center of the bottom cap has an aperture, 42, or hole. One portion of the lower swivel extends outside the housing through the hole, and another portion of the lower swivel is located inside the housing, extending through the bottom end of the length of the spindle. The loops of the swivel are rotational, so that the plane of the loop can be parallel to planes of the lateral holes arrayed on opposite sides of the bottom cap. The inner portion of the spindle fits within the hollow space of the bottom cap.

Figure 5A:
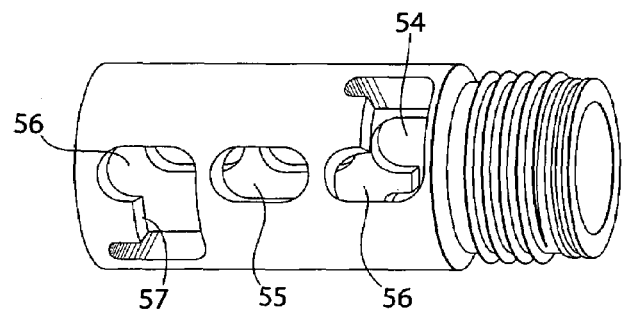
FIG. 5A is a drawing of a side view of the spindle.
Figure 5B:
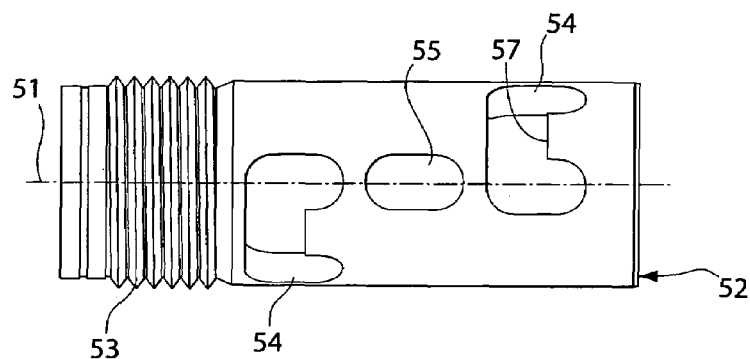
FIG. 5B is a set of drawings of the spindle in cross section through a lateral aperture, showing displacement of the spindle after rotation of 60°.
Figure 5C:
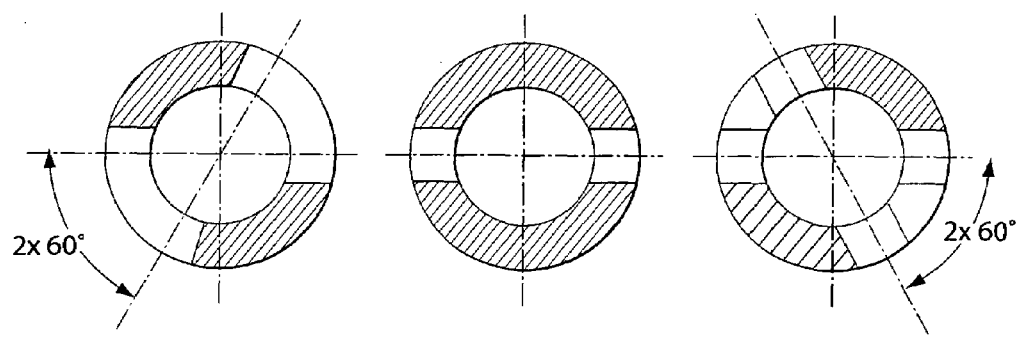
FIG. 5C is a perspective drawing of a side view of the spindle viewed showing U-shaped apertures and a middle oval aperture.

With reference to FIG. 5, the spindle is hollow and has a top end, 51 and a bottom end, 52. The top end has threads, 53, located on the outer surface of the spindle. The spindle is connected to the housing only at the top end by threads, by which means it is screwed into the top cap. In accordance with an embodiment of the invention, the spindle rests on a spring, 12 located between the bottom of the spindle and the bottom of the bottom cap as shown in FIG. 1. The portion of the swivel loop that is located inside the housing runs through the spring.

The spindle in various embodiments can be made from nickel, brass, bronze, aluminum, acrylic, stainless steel, and a composite, and a nickel-plated material from the group. An embodiment of the spindle is manufactured from nickel-plated bronze.

The spindle has a plurality of lateral apertures arranged symmetrically in pairs, each pair displaced from another pair along the length, each member of the pair arrayed around the circumference to a diametrical position 180° around. In accordance with a method of manufacture of the invention, the spindle apertures are made with a CNC machine. However, in accordance with the invention, a person skilled in the art can make the holes utilizing any method that can accurately and smoothly drill a hole through metal.

In accordance with an embodiment of the invention, a plurality, i.e., at least two pairs of spindle apertures are U-shaped, 54, and at least one pair of spindle apertures are oval, 55. The U-shaped apertures have ends of the aperture that are U termini 56, and a flat portion of the apertures, 57, connecting the U termini. The open position of the device in certain embodiments has the U-shaped apertures in an upright orientation of the U, i.e., "concave up", and in alternative embodiments in the open position in a down facing orientation, i.e., "concave down", as shown in FIG. 5A, with respect to an axis extending from top cap of the device in a downward direction. For maintaining the device in an open position during dredging when attached to a moving aquatic vessel, the down-facing U-shaped apertures result in a more stable configuration of the device when it is in use in an open position.

FIG. 5A shows a spindle having two pairs of U-shaped apertures, and in accordance with other embodiments of the invention, there may be three or more U-shaped pairs of apertures, so long as the total number and longitudinal location of pairs of spindle apertures corresponds to that of the total number and longitudinal location of pairs of lateral apertures in the housing. Each rod that extends through the hub passes through the housing via a pair of circular housing apertures, and through the spindle via either a pair of U-shaped apertures or via a pair of oval apertures, 55. The long axis of the oval aperture, parallel to the length axis of the hub, enables top to bottom movement, i.e., longitudinal movement, of a central rod. A top rod is displaced also by longitudinal movement, and also is rotationally displaced by rotating clockwise with respect to the rotationally stationary middle rod, considering the spindle in a vertical position depicted with the threads at the top, and in this orientation, the bottom rod is displaced by rotating counter-clockwise.

In accordance with an embodiment of the invention, each of the first and second U-shaped apertures has a distal portion referred to as a U-terminus located at the end of each arm of the U. In a circumferential direction, each of the U-shaped apertures extending about 60° around the spindle in an embodiment of the device that has three rods, i.e., six arms, and an upper and lower U-shaped aperture extend circumferentially in opposite directions. In accordance with additional embodiments of the invention, the U-shaped apertures may extend circumferentially to different lengths, i.e., for a device having four rods providing eight arms, the displacement would be 45°. In the embodiment of the spindle shown in FIG. 5, the U-shaped termini extend in a downward direction considering the axis from the top to the bottom of the device, strengthening maintaining the device in an open position when forces are applied as the device is pulled by a vessel through water, however the U-shaped termini can also function with the U-termini extending in an upward orientation, concave up.

Further, in embodiments having more than three rods, the shape of at least one of the pairs center apertures is oval for each aperture.

The reversible rotation of the top cap provided by the threads in contact with the spindle upper end, with respect to the mid-segments and bottom cap, is a means for alternately locking and releasing the spindle and penetrating rods within the housing in the open or closed position.

In accordance with an embodiment of the invention, the number of rods 13 is three, each of the U-shaped apertures extending extend about 60° around the spindle as described above. In accordance with other embodiments of the invention, the number of rods can be as few as two, and can also be four, five, or as many as practicable. In accordance with an embodiment of the invention, the rods are about 36 inches in length. In accordance with other embodiments of the invention, the rods may range from 10 inches to as long as practicable. In accordance with an embodiment of the invention, the rods are made of titanium. Alternatively, the rods may be manufactured from a material such as aluminum, acrylic, stainless steel, a composite, or any strong, durable material that does not rust. In accordance with an embodiment of the invention, the rods are ⅛ of an inch in their cross-sectional diameter. Alternatively, the cross-sectional diameter of the rod is can be anywhere between 1/32, 1/16, ⅛, ¼, ⅜, ½, or 5/16 of an inch or even larger, to a size appropriate to the size of the marine animal to be attracted or lured.

To place the luring dredge into the open position, the arms rotate radially around a central hub so that the arms extend from the hub, at various angles among the plurality of arms that are offset from one another. Each pair of arms is formed from a rod that extends through and is therefore approximately bisected in its length by the central hub. In an embodiment of the invention, there are three rods, and the angle of offset of the plane of one of arm in the open position with respect to another arm is about 60° around the length of the hub. When there are a different number of rods, such as four, the angle of offset of the plane is defined by the number of rods.

To place the device into its collapsed, closed position for storage, the arms rotate radially back into their original, collapsed position, the plurality of rods lying in approximately a single plane. A plane as used herein means a two-dimensional construct, such as a flat infinite piece of paper, and characterizes the relationship of the arms of the device in the collapsed position. Each of the arms within a pair of arms comprising the rod lies 180° apart on either side of the central hub in this plane, and a portion of the hub is also located in this plane.

Each of the bottom cap and each mid-segment has a pair of apertures through a lateral surface, i.e., a side or lateral aperture. On the bottom cap and each mid-segment, each of the two apertures are diametrically opposite from the other. Thus as viewed from the top, the bottom cap and each mid-segment element is circular, and each hole on their sides is 180 degrees apart from the other hole as illustrated in the middle panel of FIG. 5C. The apertures are arranged such that a straight line such as defined by the rods of the device pass sequentially through a first of the pairs of apertures, through the hollow portion of the bottom cap or mid-segment, and through the second of the pair for each of the housing and spindle.

The top cap in its attachment to the spindle contains the means for alternately tightening and loosening the components of the housing with respect to each other. The threads located on the inside the top cap correspond to threads on the outside of the top of the spindle, and provide means for the screwing the top cap with respect to the other portions of the housing. Loosening the housing allows the user of the device to place the device alternately in its open and closed positions. Further, rotationally tightening the housing by screwing the top cap with respect to the spindle locks the rods into the open or closed position.

In practice, the top cap is screwed rotationally with respect to the mid-segments and bottom cap to release the rods that are locked in the closed position, moving them into the horizontal or flat portions of the U-shaped apertures, 57. Once loosened, the top cap is pushed downward and then is further rotated, to move the rods within the U-shaped apertures from the flat portion, to the opposite U-termini from the starting position, thereby rotating the rods from resting position in which the rods are lying in a single plane in the closed position, into multiple offset planes of the open position. Then the process involves screwing the top end cap rotationally and oppositely, to lock the arms into the open position. Finally, the method optionally includes attaching lures, bait, or baited hooks, or a mixture of these, onto the arms, i.e., the lures or hooks can remain in place for storage, or for the retaining device in the open position to be used at a later time.

The rods and mid-segments are axially rotational about the axis of the length of the hub. In the open position, the pair of rods lie in a plane determined by the axis of the length through the center of the hub, and the rotated rod; and the device is locked such that each pair of the plurality of arms lies in a plane offset by an angle from the plane of the at least one of the further pair of arms, the angle determined by the number of arms. Each of the arms further comprises a plurality of swivel sleeves for attachment for lures, bait, and baited hooks. These can be obtained commercially from Rite Angler, Miami, Fla.

To place the device into the open position, the arms are rotated around the hub so that they extend from the hub at a predetermined angle from one another, the angle determined by the number of rods, which in turn determines the number of segments and pairs of lateral apertures in each of the segments of the housing and the spindle. When in use, the arms are radially distributed around the hub and are positioned along the length of the hub. Each pair of arms lies in a plane offset by an angle from respective planes of the at least one pair of other arms, the angle being determined by the number of the plurality of arms; and wherein each of the arms further comprises a plurality of swivel sleeves for attachment for lures, bait, and baited hooks.

When in the closed position for storage, the arms collapse along a single plane, and the device is placed in a specially designed carrying case, along with artificial lures or multiple devices. When the device is collapsed into the closed position for storage, the arms lie parallel to each other in a plane defined by the arms, and the axis of the length of the hub extending through the radial center of the hub. When the device is in the open position, the arms are rotated from each other, so that the plane of each arm and the axis of the length of the hub is offset from other planes for the other arms, the angle between the arms determined by the total number of rods/arms. Multiple devices can be tethered together, arrayed for dredging, for example, linearly one behind another, with, for example a larger-armed device closest to a boat and a smaller-armed device behind it, the effect of the multiple devices simulating a large bait ball for attracting fish.

In accordance with the invention, alternative types of lures and bait, for example, live, or carcasses, or artificial, may optionally be utilized alone or in combination as appropriate. The device may also be used with baited hooks, as an umbrella rig for catching smaller fish such as blue fish or striped bass.

In accordance with an embodiment of the invention, the method further includes attaching a tether, or fishing line, by tying it to the top cap swivel, and attaching the other end of the tether to the vessel.

In a further embodiment, the method optionally involves attaching a first end of a second tether to the swivel at the bottom cap, in order to provide a plurality of luring dredges to be used simultaneously. A tether can be attached to the lower swivel of a first dredge, and the other end of the tether can be tied to a second luring dredge. Should the user so choose, as many luring dredges can be arranged as desired, one behind the other in a linear fashion, or in some other arrangement involving multiple tethers of different lengths from the swivel at the bottom cap.

The invention in additional embodiments provides a carrying bag, which, for example, can in various embodiments be compartmentalized into a plurality of different chambers. The bag in different embodiments has a storage chamber for at least one luring dredge, and additional segments for bait and multiple additional luring dredges. The bag is constructed of a flexible, ventilated mesh material for strength and evaporation. However, any flexible mesh material such as leather or cloth could be utilized. A user of the carrying bag can open the bag conveniently by way of, for example, a Velcro closure.

The foregoing description of an embodiment of the invention has been presented to illustrate the principles of the invention and not to limit the invention to the particular embodiment illustrated. It is intended that the scope of the invention be defined by all of the embodiments encompassed within the following claims, and their equivalents. A skilled person will recognize that many suitable attachments may be substituted for or used in addition to the configurations described above. It should be understood that the implementation of other variations and modifications of the embodiments of the invention and its various aspects will be apparent to one skilled in the art, and that the invention is not limited by the specific embodiments described herein and in the claims. Therefore, it is contemplated to cover the present embodiments of the invention and any and all modifications, variations, or equivalents that fall within the true spirit and scope of the basic underlying principles disclosed and claimed herein.

What is claimed is:

1. A device for catching and attracting aquatic animals to a moving vessel, the device having an open position for use and a closed position for collapsing for storage, the device comprising a hub having a length and a width and a plurality of arms wherein the hub is centrally located with respect to the arms and the arms are radially distributed around the hub and along the length of the hub; wherein the hub comprises a housing and a spindle situated within the housing, the housing and the spindle being hollow, and the housing comprises a plurality of segments distributed along the length of the hub; wherein the housing and spindle further comprise a plurality of pairs of lateral apertures, wherein each member of the pair is diametrically arrayed 180° around the respective spindle and segments of the housing; the device further comprising a plurality of rods, each rod extending through a pair of lateral apertures in the segment and comprising a pair of arms; wherein the device is collapsed into the closed position for storage, the segments and rods extending through the lateral apertures we axially rotated about the length and the rods lie in a plane determined by the length of the housing and center of the hub; and wherein when the device is in the open position, the segments and rods extending through the lateral apertures are rotated and the device is locked in the open position, and each pair of arms lies in a plane offset by an angle from the plane of a further pair of arms, wherein the angle is determined by the number of arms.

2. The device according to claim 1, wherein the housing segments comprise a top cap, a bottom cap, and a plurality of mid segments situated between the top cap and bottom cap, and the spindle is enclosed in the housing.

3. The device according to claim 2, the spindle further having an upper end and a lower end within the hub, the spindle upper end having threads on an outer surface, and the top cap further having threads on an inner surface for screwing to the top of the spindle, wherein reversible rotation of the top cap along the threads in contact with the spindle upper end, with respect to the mid-segments and bottom cap, is means for alternately locking and releasing the spindle and rods within the housing in the open or closed position.

4. The device according to claim 3, wherein the top cap comprises means for loosening the position of the device into a position for rotational movement of the spindle and rods.

5. The device according to claim 3, wherein each of at least one pair of spindle lateral apertures is U-shaped, and the rod penetrating the housing segment and spindle through a U-shaped aperture portion is alternately and rotationally displaced from one to another U termini as the device is opened or closed, respectively.

6. The device according to claim 4, wherein rotationally screwing the top cap and with respect to the spindle locks the rods into the open or closed position.

7. The device according to claim 1, wherein the spindle comprises at least one material selected from the group of: nickel, brass, bronze, aluminum, acrylic, stainless steel, a composite, and a nickel-plated material selected from the group.

8. The device according to claim 1, wherein at least one of the top cap and the bottom cap further comprises a swivel having an inner loop and an outer loop, each loop moving rotationally with respect to the other loop, the swivel located in each of the top cap and the bottom cap inserted so that an inner loop of the swivel is within and a first of the plurality of rods extends through the housing and spindle and further extends through the inner loop of the swivel.

9. The device according to claim 8 wherein the first rod extends through the bottom cap through the circular lateral aperture of the housing, the U-shaped aperture of the spindle, the swivel loop, the U-shaped aperture diametrically arrayed on the spindle, and the lateral aperture diametrically arrayed on the bottom cap.

10. The device according to claim 1 wherein at least one pair of the plurality of lateral spindle apertures are oval wherein the long axis of the oval is parallel to the length of the spindle, and at least one pair of apertures is U-shaped.

11. The device according to claim 1, wherein the plurality of rods is three rods, and the angle of offset of the plane of one of arm in the open position with respect to another arm is about 60° around the length of the hub.

12. The device according to claim 1, wherein the plurality of rods is four rods, and the angle of offset of the plane of one of arm in the open position with respect to another arm is about 45° around the length of the hub.

13. The device according to claim 1, wherein the rod is at least about 10 inches in length.

14. The device according to claim 1, wherein the rod is about 36 inches in length.

15. The device according to claim 1, further comprising a spring located between the lower end of the spindle in the housing and bottom cap.

16. A kit for a unitary collapsible device for catching or attracting an aquatic animal comprising at least one device according to claim 1 and a carrying bag.

17. The kit according to claim 16, further comprising at least one hook, lure or artificial bait.

18. The kit according to claim 16, wherein at least one of the devices comprises a plurality of devices, each having rods of length a different than rods of another device.

19. The device according to claim 1, wherein each of the arms further comprises a plurality of swivel sleeves for attachment for at least one of lures, bait, and baited hooks.

* * * * *